United States Patent [19]

Okumura et al.

[11] Patent Number: 5,069,832
[45] Date of Patent: Dec. 3, 1991

[54] DEGATING METHOD

[75] Inventors: Toshikata Okumura, Toyama; Yukio Nakamura, Kawaguchi; Noriei Yoneoka, Toda; Syuiti Hachikawa, Toyama, all of Japan

[73] Assignees: Kabushiki Kaisha Fujikoshi, Toyama; Nissui Kako Co., Ltd., Kawaguchi, both of Japan

[21] Appl. No.: 599,111

[22] Filed: Oct. 17, 1990

[30] Foreign Application Priority Data

Oct. 25, 1989 [JP] Japan ................... 1-276150

[51] Int. Cl.$^5$ .......................... B06B 3/00; B29C 35/08; B29C 37/02; B29C 45/38
[52] U.S. Cl. ....................... 264/23; 264/25; 264/71; 264/72; 264/161; 264/162; 264/163; 425/174.2; 425/553
[58] Field of Search ............. 264/23, 25, 69, 70, 264/71, 72, 161, 328.11, 328.15, 336, 162, 163; 425/425, 806, 553, 554, 556, 577, 174.2

[56] References Cited

U.S. PATENT DOCUMENTS

| | | | |
|---|---|---|---|
| 3,595,453 | 7/1971 | Sherry | 264/23 X |
| 4,017,237 | 4/1977 | Webster | 264/23 X |
| 4,120,921 | 10/1978 | Webster | 264/23 |
| 4,332,750 | 6/1982 | Roggenburg, Jr. et al. | 264/23 |
| 4,645,629 | 2/1987 | Stern | 264/23 |
| 4,856,980 | 8/1989 | Laurita | 264/69 X |
| 4,925,161 | 5/1990 | Allan et al. | 264/69 |
| 4,952,354 | 8/1990 | Yokoi et al. | 264/69 |

FOREIGN PATENT DOCUMENTS 188730 7/1989 Japan .

Primary Examiner—Jan H. Silbaugh
Assistant Examiner—Karen Aftergut
Attorney, Agent, or Firm—Spencer & Frank

[57] ABSTRACT

A method for degating an injection molded plastic article includes the steps of filling a mold cavity with a molten plastic, dwelling and cooling the mold subsequent to filling to effect gate seal. A first degating punch and a second punch are provided slidably inserted in holes in the mold which cross a gate in an axial direction, being the direction in which a movable mold half is opened and closed. The punches are vibrated at a high frequency after gate seal is completed in order to soften the solidified plastic in the gate. The punches are then displaced with respect to the gate when the plastic is softened in order to effect degating. In another method, a step of cutting the gate in the molded article by sliding the punches occurs during both dwelling after filling the mold with the molten plastic, and cooling subsequent to the completion of dwelling, and before gate seal is effected. While the punches are subject to vibration with high frequency or slow reciprocating motion, the side surfaces of the punches are contacted against the degated surface to obtain a good cut surface on the molded article.

5 Claims, 2 Drawing Sheets

DEGATING METHOD

FIELD OF THE INVENTION

The present invention relates to injection molding of plastics and, more particularly, to a method for degating a molded plastic article in a mold in an ideal condition during molding of the article before the finished article and the runner are taken out separately.

BACKGROUND OF THE INVENTION

When plastics are injection molded, a gate is connected to a mold cavity to inject the plastic material into the cavity. This gate can assume various forms, such as side gate, pin gate, fan gate, disk gate, and film gate. Except for the pin gate, the article and the runner are taken out of the mold usually as a unit after they are connected together at the gate. The molded article is degated in a subsequent step to complete the article.

Conventional degating methods are disclosed, for example, in U.S. application Ser. No. 348,820, now U.S. Pat. No. 4,952,354 entitled "Degating Method" and Japanese Patent application No. 188730/1989. In these techniques, a member constituting a gate is made slidable relative to a mold cavity or a core on a plane that is inclined at about 90° with respect to the axial direction in which the mold is opened. After the gate is completely sealed subsequent to the filling of the material or during dwelling or pressure holding, the member constituting the gate is vibrated or reciprocated with high frequency. The energy of the vibration softens the plastic around the gate. When the plastic softens sufficiently, the member is displaced to degate the plastic.

In the above-described degating method, the degating leaves no traces and, therefore, it is possible to fabricate aesthetically excellent products. This known method is effective for gates connected to narrow runners, but the energy of the vibration is not transmitted to wide gates such as film gates. For this reason, it has been impossible to finish the degated surface as desired, using wide gates. More specifically, in the conventional method, the sliding member constituting the gate of the mold is displaced on a plane inclined at 90° with respect to the axial direction in which the mold is opened and closed. This method is effective for gates having small cut areas. However, such gates are very few in number. The conventional method cannot be applied to general molds having broad planar portions.

SUMMARY OF THE INVENTION

It is an object of the present invention to provide an accurate degating method which relies on vibration with high frequency and can be applied to general gates that are wide in a plane inclined at 90° with respect to the axial direction in which the mold is opened and closed.

The above object is achieved in accordance with the teachings of the first method of the invention by a degating method comprising the steps of: filling the cavity of a mold with a molten plastic, the mold having a fixed mold half, a movable mold half, and a gate, the mold halves being provided with holes crossing the gate in an axial direction in which the movable mold is opened and closed, the holes having a first degating punch and a second punch axially and slidably inserted in their respective ones of said holes, movement of the first punch in the axial direction being transmitted to the second punch via the plastic filled between the mold halves; vibrating with high frequency at least one of the two punches when gate seal is completed after the plastic is injected into the cavity, i.e., during at least one of dwelling and the subsequent cooling, so that the vibrational energy softens the plastic around the gate; and displacing the vibrated punch when the plastic is softened sufficiently, to degate the plastic.

In this method, at least one of the axial punches is vibrated with high frequency or reciprocated in the direction in which the mold is opened and closed. The vibrational energy softens the plastic at the gate. During or after dwelling, the plastic is degated. The degated surface is rubbed against the punch. As a result, aesthetically excellent products having no traces of degating can be molded even if the gate is wide such as a film gate, which would have been impossible to realize by the prior art rotating method or sliding method. The second method according to this invention comprises the step of cutting the gate in the molded plastic article by sliding one of the punches to degate plastic during both dwelling subsequent to the filling and cooling subsequent to the completion of the dwelling. While said punches are subjected to vibration with high frequency or slow reciprocating motion, the side surface of the punch is contacted against the degated surface to obtain a good cut surface. This method provides nearly the same effect as the first method.

DESCRIPTION OF THE PREFERRED EMBODIMENTS

Figure 1:
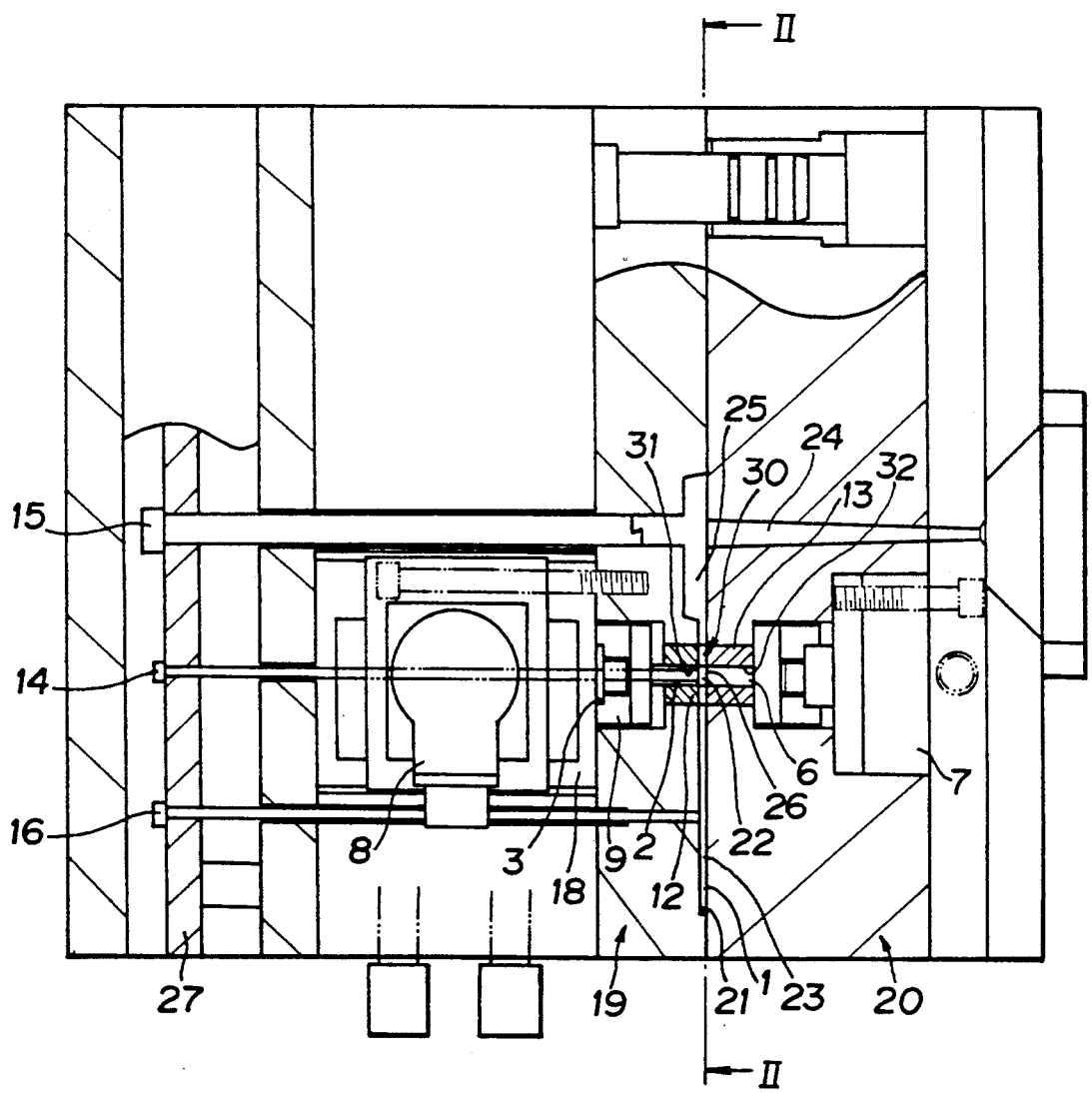
FIG. 1 is a cross-sectional view of main portions of a mold carrying out a degating method according to the invention.

Referring to FIG. 1, there is shown a mold having a single cavity or core, the mold being used to carry out a degating method according to the invention. The mold comprises a movable mold half 19, a fixed mold half 20, a movable insert die 12 removably mounted in the fixed mold half 20, a fixed insert die 13 removably mounted in the fixed mold half 20, a gate 22, a sprue 24, a runner 25 connecting the sprue 24 to the gate 22, a degating punch 2, and a degating bias punch 6. The movable mold half 19 can be moved away from the fixed mold half 20 to open the mold, the fixed mold half 20 being mounted to a device (not shown). In the illustrated condition, the movable mold half 19 is in contact with the fixed mold half 20. Resin or plastic 1 is injected into the cavity 21 to mold an article 23. The portion of the molded article 23 which is located at the gate 22 is indicated by reference numeral 30. The degating punch 2 is slidably inserted in a hole 31 formed in the movable insert die 12 which forms a part of the movable mold half 19. The hole is so formed as to cross the gate 22 in an axial direction in which the movable mold half 19 is opened and closed. The hole 31 is so located that the portion 30 of the molded article is cut off by the punch 2. The fixed insert die 13 cooperates with the movable insert die 12 to form the cavity 21 or core on the surface of the fixed mold half, against which the movable mold half bears. The fixed insert die 13 which forms a part of the fixed mold half 20, is provided with a hole 32 registering with the hole 31, and crossing the gate 22 in the axial direction in which the movable mold half 19 is opened and closed. The degating bias punch 6 is slidably inserted in the hole 32 such that its surface 26 is contactable with the resin 1 filled in the gate 22.

The mold further includes a hydraulic servo cylinder 18 and a hydraulic bias cylinder 7 to which the degating punch 2 and the degating bias punch 6 are respectively held. When the punch 2 vibrates with high frequency, the vibration is transmitted to the punch 6 via the resin 1 filled between the insert dies 13 and 12 synchronously with the movement of the punch 2, so that when the punch 2 vibrates with high frequency, the bias punch 6 also vibrates similarly. The punch 2 is driven independent of the movable insert die 12. The degating bias punch 6 can move relative to the fixed insert die 13.

Figure 2:
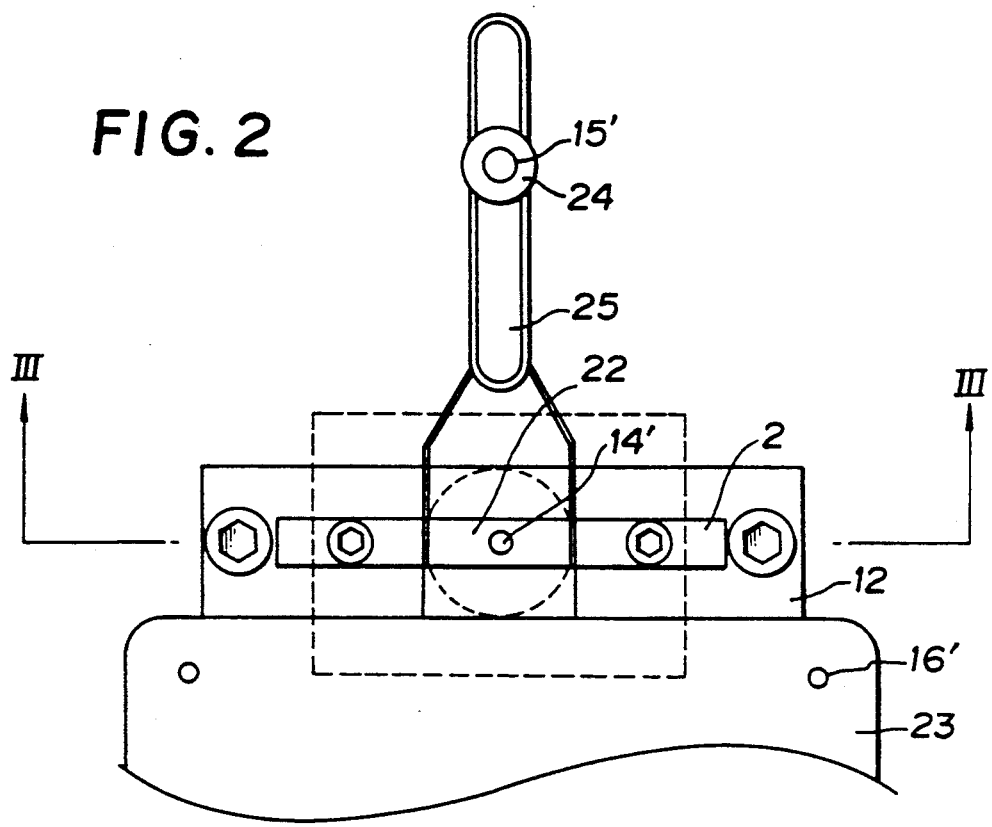
FIG. 2 is a cross-sectional view taken on line II—II of FIG. 1.

Also shown in FIG. 1 are an ejector plate 27, a runner ejector pin 14 located at the position of the gate, a sprue ejector pin 15, a molded article ejector pin 16, a hydraulic servo cylinder rod 3, a hydraulic servo cylinder joint adapter 9, and a servo valve 8. One end of each of the ejector pins 14, 15, 16 is fixed to the ejector plate 27. These pins 14–16 extend through the movable mold half 19 or the degating punch 2 and through the hydraulic servo cylinder rod 3. The positions of the ejector pins 14–16 are indicated by 14', 15', 16', respectively, in the cross-sectional view of FIG. 2.

Figure 3:
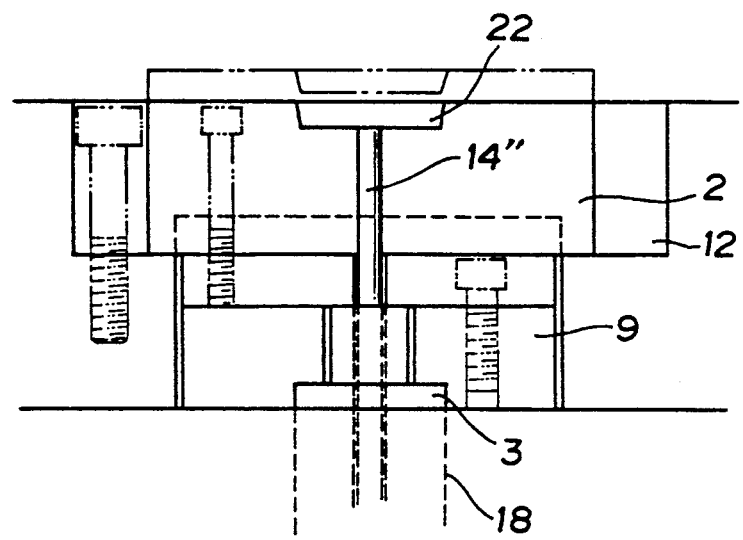
FIG. 3 is a cross-sectional view taken on line III—III of FIG. 2.

FIG. 3 shows the connection of the degating punch 2 with the hydraulic servo cylinder 18. The punch 2 is connected with the hydraulic servo cylinder rod 3 by the hydraulic servo cylinder joint adapter 9. The cylinder 18 is fixedly mounted in the movable mold half 19 and actuated by a device (not shown) and the servo valve 8. Thus, the joint adapter 9 and the degating punch 2 can be vibrated or reciprocated with high frequency.

The hydraulic bias cylinder 7 is fixedly mounted in the fixed mold half 20 actuated by a device (not shown). Movement of the degating punch 2 is so transmitted to the degating bias punch 6 via the injected resin 1, that the bias punch 6 is made to move synchronously with the punch 2. The cylinders 18 and 7 may be mounted outside the mold halves 19 and 20, respectively.

One degating method according to the invention is now described. When the resin is started to be injected into the sprue 24 from the front end of the nozzle of an injection molding machine (not shown), the resin 1 flows through the sprue 24, the runner 25, and the gate 22. Then, the resin fills in the cavity 21.

During the injection or dwelling, the degating punch 2 and the degating bias punch 6 are held in the illustrated positions by the hydraulic servo cylinder 18 and the hydraulic bias cylinder 7, respectively. After the completion of the filling, a cooling step is effected while the pressure is maintained or held. Since, plastics contract as they are cooled additional resin must be supplied in the dwelling step. The resin is cooled and solidified around the gate 22, thus sealing of the gate is completed. Because the cross section at the gate 22 is smaller than at any other location inside the cavity 21, the resin at the gate 22 is cooled more quickly than the resin forming the article, therefore, after the gate is sealed, the effect of the dwelling is lost. Consequently, the molded article 23 is by no means affected if the resin is degated on the completion of the seal, i.e., during at least one of the dwelling step and the subsequent cooling step. After the gate has been completely sealed, the servo cylinder 18 is vibrated with high frequency by a device (not shown). The reciprocating movement of the cylinder 18 vibrates with high frequency the hydraulic servo cylinder joint adapter 9 and the degating punch 2. The vibrational energy heats up and softens the resin at the boundary between the cavity 21 and the gate 22 and at the boundary between the gate 22 and the runner 25.

When the resin softens at the above boundary area around the gate 22, the degating punches 2 and 6 are displaced to degate the resin in the gate 22. Since the softening and the cutting of the resin are completed in a few seconds, these two steps can be carried out simultaneously with the cooling of the molded article. In this way, the productivity is not inferior to the productivity of the prior art molding.

After the degating and the cooling are completed, the movable mold half 19 and the movable insert die 12 are caused to recede to open the mold, in the same way as in normal injection molding. The molded article 23 and the runner 25 are taken out. Thus, the molding process is completed. The degating punch 2 and the degating bias punch 6 are returned to their original positions by devices (not shown) prior to the next mold closing or clamping. In this way, preparations for the next molding are made.

Further, after the degating step and prior to the opening of the mold halves, the degating punch 2 may be vibrated with high frequency by the servo cylinder 18 via the hydraulic servo cylinder joint adapter 9 for a short time, so that, the degated resin surface is made to contact and rub against the side surface of the vibrating punch 2. As a result, the degated surface can be finished more smoothly. It is also possible to slowly reciprocate the degating punch 2 for a short time to gain the same smooth degated surface.

Another degating method according to the invention is next described. This method uses the mold shown in FIGS. 1–3 in the same way as the method described already. When molten resin is started to be injected into the sprue 24 from the front end of the nozzle of an injection molding machine (not shown), the molten resin 1 passes through the sprue 24, the runner 25, and the gate 22 to fill in the cavity 21. When the filling is completed, the resin is started to be cooled while retaining the pressure. When the resin starts to cool and solidify at the gate 22 before the gate is sealed, the viscosity of the resin at the gate 22 increases greatly. In this state, it is impossible to compensate for the contraction by the dwelling, but the resin is sufficiently soft to cut.

More specifically, in the dwelling step and cooling step subsequent to the completion of the dwelling, the resin has usually the smallest cross section at the gate 22 and will cool and solidify first. Therefore, the resin is too hard to be injected into the cavity 21 against the pressure but sufficiently soft to cut during the time interval starting with a lapse of a certain time from the beginning of the dwelling step. During this time interval, the degating punch 2 is displaced in the axial direction in which the movable mold half 19 is opened and closed by the hydraulic servo cylinder 18 to degate the resin in the gate 22. After the degating punch 2 is displaced, the cylinder 18 is actuated to vibrate the punch 2 with high frequency only for a short time. Just when the resin is degated, the degated surface is still soft, and side surfaces of the degating punches and 2 and 6 are made to contact and rub against the degated surface for lapping the degated surface of the molded resin article. Hence, the degated surface is finished to give a gloss to it. The cutting step and the subsequent rubbing step are completed in only a few seconds and so the productivity is not inferior to the productivity of the prior art injection molding. Because the resin is degated when the effect of the dwelling ceases, the molded article is not adversely affected at all.

Depending on the kind of resin, the degating punch 2 can be reciprocated slowly to rub the side surface of the degating punch 2 against the degated surface, instead of imparting high-frequency vibration to the degating punch 2 during the rubbing step after the degating step. Also in this case, a well glossed degated surface is obtained. After the degating and rubbing steps, the mold is opened in the same way as in the ordinary injection molding. The molded article and the runner are then taken out of the cavity 21, thus completing the molding process. The degating punch 2 and the degating bias punch 6 are returned to their original positions by devices (not shown) before the next mold clamping. In this manner, preparations for the next molding are made.

What is claimed is:

1. A degating method comprising the steps of:
   filling a cavity of a mold with molten plastic, the mold having a fixed mold half, a movable mold half, and a gate, the mold halves being provided with holes crossing the gate in an axial direction in which the movable mold half is opened and closed, the holes having a first degating punch and a second punch axially and slidably inserted in respective ones of the holes, movement of the first punch in the axial direction being transmitted to the second punch via the plastic filling the cavity of the mold such that the second punch moves synchronously with the movement of the first punch;
   dwelling and cooling the molten plastic at the gate in the mold so as to seal the gate subsequent to the filling step; thereafter
   vibrating with high frequency one of the two punches after the gate is sealed during both dwelling subsequent to the filling and the subsequent cooling, so that the vibrational energy softens the plastic around the gate;
   the step of vibrating with high frequency including transmitting the vibration of the one of the two punches to the other of the two punches through the plastic filled between the two punches, such that the punches move synchronously to heat and soften the plastic for facilitating degating of the plastic when the two punches are further displaced together to degate the softened plastic; and
   displacing the vibrated one punch of the vibrating step when the plastic is softened to degate the plastic.

2. The degating method of claim 1, wherein the step of vibrating includes vibrating the two punches at the same time synchronously; and further, the step of displacing the punch is followed by the step of causing the punch to vibrate with high frequency for a short time causing a side surface of the punch to contact and rub against a degated surface of the plastic.

3. The degating method of claim 1, wherein the step of vibrating includes vibrating the two punches at the same time synchronously; and further the step of displacing the punch is followed by a step of causing a side surface of the punch to contact against a degated surface of the plastic for a short time while slowly reciprocating the punch.

4. A degating method comprising the steps of:
   filling a cavity of a mold with molten plastic, the mold having a fixed mold half, a movable mold half, and a gate, the mold halves being provided with holes crossing the gate in an axial direction in which the movable mold half is opened and closed, the holes having a first degating punch and a second punch axially and slidably inserted in respective ones of the holes, movement of the first punch in the axial direction being transmitted to the second punch via the plastic filling the cavity of the mold such that the second punch moves synchronously with the movement of the first punch;
   dwelling and cooling the molten plastic in the mold so as to seal the gate subsequent to the filling step;
   sliding one of the punches in the axial direction to degate the plastic during both dwelling subsequent to the filling and cooling subsequent to completion of the dwelling; and
   bringing a side surface of the slided punch into sliding contact with a degated surface of the plastic for a short time while vibrating with high frequency the slided one of the punches, to finish the degated surface.

5. A degating method comprising the steps of:
   filling a cavity of a mold with molten plastic, the mold having a fixed mold half, a movable mold half, and a gate, the mold halves being provided with holes crossing the gate in an axial direction in which the movable mold half is opened and closed, the holes having a first degating punch and a second punch axially and slidably inserted in respective ones of the holes, movement of the first punch in the axial direction being transmitted to the second punch via the plastic filling the cavity of the mold such that the second punch moves synchronously with the movement of the first punch;
   dwelling and cooling the molten plastic in the mold so as to seal the gate subsequent to the filling step;
   sliding one of the punches in the axial direction to degate the plastic during both dwelling subsequent to the filling and cooling subsequent to completion of the dwelling; and
   bringing a side surface of the slided punch into sliding contact with a degated surface of the plastic for a short time while imparting slow reciprocating movement to the slided one of the punches, to finish the degated surface.

* * * * *